(12) United States Patent
Gurosik

(10) Patent No.: US 8,545,124 B2
(45) Date of Patent: Oct. 1, 2013

(54) COUPLING APPARATUS

(76) Inventor: John O. Gurosik, Kersey, PA (US)

( * ) Notice: Subject to any disclaimer, the term of this patent is extended or adjusted under 35 U.S.C. 154(b) by 0 days.

(21) Appl. No.: 10/521,897

(22) PCT Filed: Aug. 1, 2002

(86) PCT No.: PCT/US02/24579
§ 371 (c)(1),
(2), (4) Date: Jan. 18, 2005

(87) PCT Pub. No.: WO03/012333
PCT Pub. Date: Feb. 13, 2003

(65) Prior Publication Data
US 2006/0034651 A1 Feb. 16, 2006

Related U.S. Application Data

(60) Provisional application No. 60/309,357, filed on Aug. 1, 2001.

(51) Int. Cl.
*A01B 51/00* (2006.01)
(52) U.S. Cl.
USPC .............................. 403/321; 172/272; 37/468
(58) Field of Classification Search
USPC ................. 403/301, 314, 316, 319, 321, 324; 37/468; 172/272; 414/723
See application file for complete search history.

(56) References Cited

U.S. PATENT DOCUMENTS

| | | | |
|---|---|---|---|
| 1,622,619 A | 3/1927 | Warrren | |
| 3,760,883 A * | 9/1973 | Birk | 172/273 |
| 4,100,688 A * | 7/1978 | Grist | 172/272 |
| 4,663,922 A * | 5/1987 | Anderson et al. | 172/272 |
| 5,098,252 A * | 3/1992 | Sheesley et al. | 414/723 |
| 5,263,810 A * | 11/1993 | Takekata et al. | 414/723 |
| 5,350,250 A * | 9/1994 | Nagler | 403/316 |
| 5,820,332 A * | 10/1998 | Philips et al. | 414/723 |
| 6,095,255 A | 8/2000 | Geertson | |
| 6,390,765 B1 * | 5/2002 | Dick | 414/723 |

FOREIGN PATENT DOCUMENTS

WO WO 83/03629 * 10/1983 ............... 37/468

* cited by examiner

*Primary Examiner* — Michael P Ferguson

(57) ABSTRACT

A coupling apparatus (10) includes a first coupling element (12) and a second coupling element (14). The first coupling element (12) has a mating surface (16) and a wedging surface (22) at the first end (18) of the first coupling element (12). An engagement surface (30) is located at the second end (20) of the first coupling element (12) and an alignment orifice (32) extends through the first coupling element (12). A second coupling element (14) also includes a mating surface (46) and a wedge member (48) at the first end (42) of the second coupling element (14). This wedge member (48) engages the wedging surface (22). An alignment member (60) at least partially extends through the alignment orifice (32), and a locking tab (62) extends from the second coupling element mating surface (46) and engages the engagement surface (30).

10 Claims, 2 Drawing Sheets

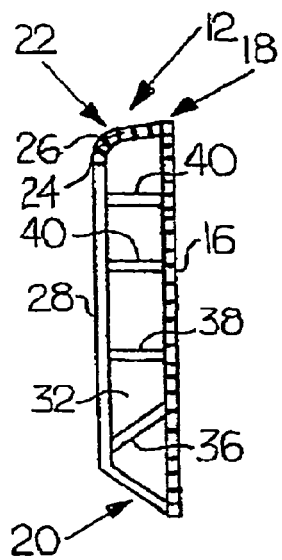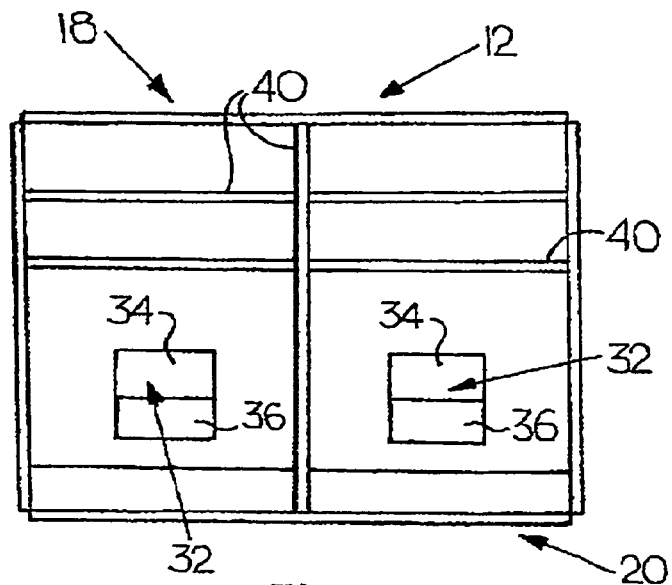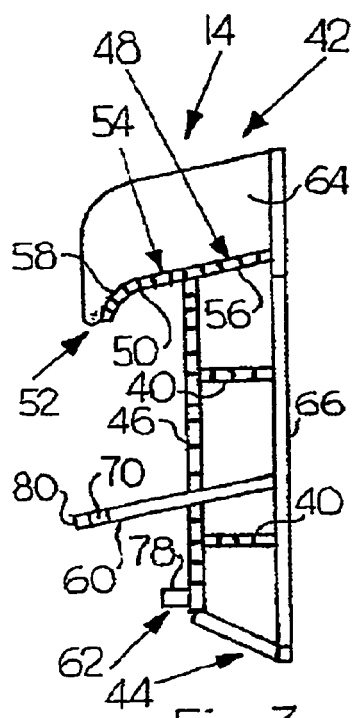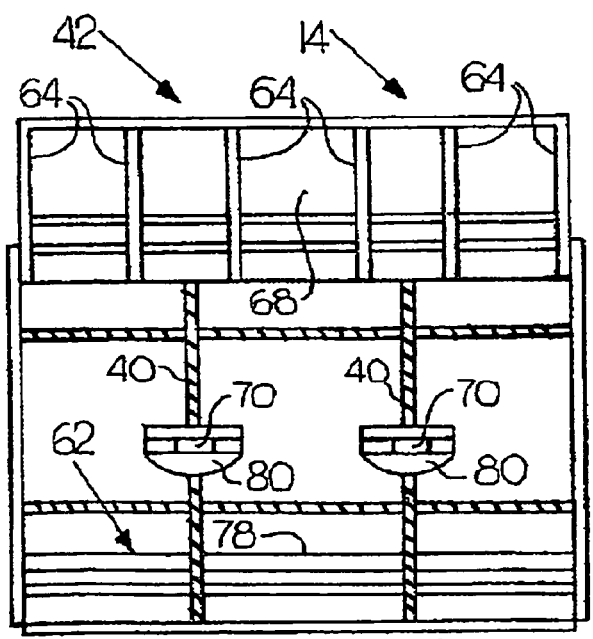

COUPLING APPARATUS

BACKGROUND OF THE INVENTION

1. Field of the Invention

The present invention relates generally to attachment and coupling devices and, in particular, to a coupling apparatus for attaching a heavy object or machinery to a locomotive force, such as a vehicle.

2. Description of Related Art

Various attachment, coupling and clamping apparatuses are well known in the art. In order to attach a first object to a second object or, in many cases, an object to a vehicle, a coupling device is utilized. In the case of attaching a heavy moveable object to a vehicle, a reinforced tongue-in-groove or pin and recess structure is typically used. For example, attaching a trailer to a truck for transport.

In order to couple a large and heavy piece of machinery or equipment to a vehicle, such as a bulldozer, typically the entire apparatus, including the bulldozer, is modified and a new vehicle/machine combination is created. This modification is required, due to the large weight involved with many industrial-scale machines and devices. In addition, such modification is typically permanent and does not allow for easy removal of the machine from the vehicle.

There remains a need in the art for a coupling apparatus that is able to be easily engaged and disengaged, thus allowing a single vehicle to transport and/or manipulate multiple pieces of machinery and equipment. There also remains a need for a coupling apparatus that, while being easily disengageable, is able to fully and safely support a manipulated piece of heavy industrial machinery.

SUMMARY OF THE INVENTION

It is an object of the present invention to provide a coupling apparatus that overcomes the deficiencies in the prior art. It is another object of the present invention to provide a coupling apparatus that can be efficiently engaged and disengaged. It is yet another object of the present invention to provide a coupling apparatus that is particularly adapted to attach a large, heavy piece of industrial equipment to a locomotive force, such as a vehicle.

The present invention is a coupling apparatus and includes a first coupling element and a second coupling element. The first coupling element has a mating surface positioned between the first coupling element first end and the first coupling element second end. A wedging surface is positioned on the first end of the first coupling element, and an engagement surface is positioned on the second end of the first coupling element. The first coupling element also includes an alignment orifice, and in a preferred embodiment, includes multiple alignment orifices.

The second coupling element is adapted to be releasably attached to the first coupling element. This second coupling element also includes a mating surface, which abuts the mating surface of the first coupling element. A wedge member is positioned on the first end of the second coupling element and includes a wedge member surface extending from the second coupling element mating surface for engaging the wedging surface of the first coupling element. The wedge member has a distal end position lower than the wedge member proximal end. The second coupling element includes an alignment member, and typically multiple alignment members, which extend from the second coupling element mating surface, and are adapted to further extend at least partially through the alignment orifice. A locking tab extends from the mating surface for abutting the engagement surface at the second end of the first coupling element.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWINGS

FIG. 1 is a side, sectional view of a first coupling element of a coupling apparatus according to the present invention;

FIG. 2 is a front, sectional view of the first coupling element shown in FIG. 1;

FIG. 3 is a side, sectional view of a second-coupling element of a coupling apparatus according to the present invention;

FIG. 4 is a front, sectional view of the second coupling element shown in FIG. 3;

DESCRIPTION OF THE PREFERRED EMBODIMENTS

Figure 5:
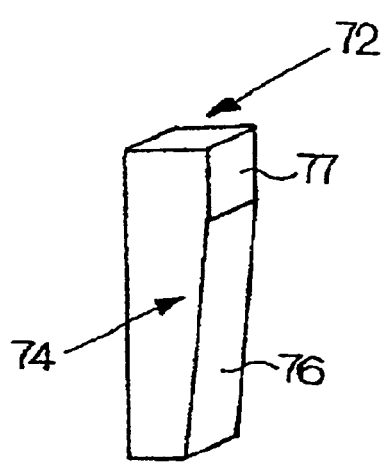
FIG. 5 is a perspective view of a locking pin of a coupling apparatus according to the present invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

The present invention is a coupling apparatus 10 and is illustrated in FIGS. 1-7. This coupling apparatus 10 includes a first coupling element 12 and a second coupling element 14. The second coupling element 14 and the first coupling element 12 are releaseably attachable to each other and are sized and shaped to accordingly mate.

As seen in FIGS. 1 and 2, the first coupling element 12 includes a first coupling element mating surface 16, which in a preferred embodiment, is a planar surface. The first coupling element mating surface 16 is positioned between and extends between a first coupling element first end 18 and a first coupling element second end 20. Located on the first coupling element first end 18 is a wedging surface 22. As best seen in FIG. 1, in a preferred embodiment, the wedging surface 22 has a curved portion 24 and a planar portion 26. In this embodiment, the planar portion 26 of the wedging surface 22 extends from an upper end of the first coupling element mating surface 16 and gradually extends into the curved portion 24, which, in turn extends into a first coupling element rear member 28.

The first coupling element 12 also includes an engagement surface 30 positioned at the first coupling element second end 20. In a preferred embodiment, the engagement surface 30 is located at a bottom portion of a plate member, which forms the mating surface 16 of the first coupling element 12.

The first coupling element 12 has an alignment orifice 32 extending through the first coupling mating surface 16, and further through the first coupling element rear member 28. As seen in FIGS. 1 and 2, in a preferred embodiment, the coupling apparatus 10 includes two alignment orifices 32, both alignment orifices 32 having a generally rectangular opening 34. In addition, in this embodiment, a bottom surface 36 of the alignment orifice 32 is beveled or angular, extending in an angle downward relative to an upper surface 38 of the alignment orifice 32.

The first coupling element 12 may be constructed from a variety of materials, but is preferably manufactured from a sturdy, durable material, such as steel or other strong metal. While it is envisioned that the first coupling element 12 can be a solid, steel element, in a preferred embodiment, as shown in FIGS. 1 and 2, the first coupling element 12 is constructed from multiple metallic plates, attached together at various meeting points. This use of multiple, segmented plates allows the first coupling element 12 to maintain its strength, yet drastically decrease its weight.

When using this box-like structure, the first coupling element 12 includes support plates 40 connecting various surfaces. For example, in the preferred embodiment illustrated in FIGS. 1 and 2, the first coupling element 12 includes two horizontal support plates 40 connected between the first coupling element mating surface 16, the first coupling element rear member 28 and side surfaces of the first coupling element 12. Similarly, this embodiment includes a support plate 40 connected between the first coupling element mating surface 16, the first coupling element rear member 28, the first coupling element first end 18 and the first coupling element second end 20. The support plates 40 can be welded together, as well as welded to the various surfaces of the first coupling element 12, and create a rigid, sturdy and structurally sound first coupling element 12.

The coupling apparatus 10 also includes a second coupling element 14, as illustrated in FIGS. 3 and 4. It is this second coupling element 14 that is sized and shaped so as to mate with the first coupling element 12. The second coupling element 14 includes a second coupling element first end 42 and a second coupling element second end 44.

The second coupling element 14 also may be constructed from a variety of materials, but is preferably manufactured from a sturdy, durable material, such as steel or other strong metal. As with the first coupling element 12, the second coupling element 14 may also be constructed from multiple plate members in a box-like structure. Again, this reduces the overall weight of the second coupling element 14. Also, as with the first coupling element 12, the second coupling element 14 also uses support plates 40 for increasing the structural integrity of the segmented or plate structure. As seen in FIG. 4, in a preferred embodiment, the second coupling element 14 includes two horizontal support plates 40 and two vertical support plates 40.

The second coupling element 14 includes a second coupling element mating surface 46, and it is this second coupling element mating surface 46 that abuts the first coupling element mating surface 16. As with the first coupling element mating surface 16, in a preferred embodiment, the second coupling element mating surface 46 is a planar surface, such that the first coupling element mating surface 16 and the second coupling element mating surface 46 are positioned immediately against each other at substantially all points when the first coupling element 12 is engaged with the second coupling element 14. It is also envisioned that both the first coupling element mating surface 16 and the second coupling element mating surface 46 can be sized and shaped in various manners in order to increase the loading capability of the coupling apparatus 10.

The second coupling element 14 includes a wedge member 48 located on the second coupling element first end 42, and a wedge member surface 50 extends from the second coupling element mating surface 46. The wedge member surface 50 is sized such that it can engage the wedging surface 22 of the first coupling element 12. In order to appropriately engage the wedging surface 22, the wedge member 48 has a distal end 52 positioned lower than a wedge member proximal end 54. Also, in the preferred embodiment, the wedge member surface 50 is shaped so as to substantially correspond with the wedging surface 22. Therefore, in this embodiment, the wedge member surface 50 also includes a wedge member surface planar portion 56 and a wedge member surface curved portion 58, with the wedge member surface planar portion 56 corresponding with the wedging surface planar portion 26, and the wedge member surface curved portion 58 corresponding with the wedging surface curved portion 24. As best seen in FIG. 3, it is the use of this wedge member surface planar portion 56 and wedge member surface curved portion 58 that creates a hook-like structure capable of hooking over and engaging the wedging surface 22 of the first coupling element 12.

The second coupling element 14 also includes an alignment member 60 extending from the second coupling element mating surface 46. In a preferred embodiment, the second coupling element 14 includes two alignment members 60, and these alignment members 60 are able to be inserted within and at least partially through the matching alignment orifices 32 of the first coupling element 12. In addition, in this preferred embodiment, the alignment members 60 extend at a downward angle with respect to the second coupling element mating surface 46. This angle is used for engagement, disengagement, and securement functionality.

Finally, the second coupling element 14 includes a locking tab 62, which extends from the second coupling element mating surface 46 and is positioned near the first coupling element second end 44. This locking tab 62 is adapted to abut and engage the engagement surface 30 of the first coupling element 12.

In the preferred embodiment, located immediately above and attached to the wedge member 48 is at least one and preferably multiple wedge member supports 64. The wedge member supports 64 are attached between the wedge member 48 and a second coupling element rear member 66. As with the support plates 40, the wedge member supports 64 provide greater structural strength to the second coupling element 14 and, further, provide greater strength to the coupling apparatus 10 after engagement of the first coupling element 12 and the second coupling element 14. Also, as seen in FIG. 4, multiple wedge member supports 64 can be located in a spaced-apart position at various locations along the wedge member 48. In addition, the wedge member 48 can extend fully, or in a preferred embodiment partially, across the second coupling element second end 42. In the preferred embodiment shown in FIG. 4, the wedge member 48 includes a break or cut-out portion 68. This cut-out portion 68 is included for clearance purposes when using the coupling apparatus 10 with various devices, machinery and equipment.

As discussed previously, the wedge member surface 50 is shaped so as to align it with the wedging surface 22. It is also envisioned that both the wedge member surface 50 and the wedging surface 22 can have a variety of shapes, such as a straight bevel or angle, but these surfaces increase the structural integrity when they are in a substantially mating relationship. Also in the preferred embodiment, the planar portion 26 of the wedging surface 22, and the planar portion 56 of the wedge member surface 50, extend at an angle of 78 degrees with respect to the first coupling element mating surface 16 and the second coupling element mating surface 46. It is the aligning shape and engagement between the wedge member surface 50 and the wedging surface 22 that allow for a secure engagement between the first coupling element 12 and the second coupling element 14.

In order to further secure the second coupling element 14 to the first coupling element 12 when they are engaged, each alignment member 60 may also include a locking orifice 70. After the alignment members 60 have been inserted through and extend at least partially beyond the alignment orifice 32 of the first coupling element 12, a locking pin 72 is inserted through the locking orifice 70. In this manner, the locking pin 72 frictionally engages the locking orifice 70, as well as the first coupling element rear member 28. This locking pin 72 can be a wedge member 74, as shown in FIG. 5, and the wedge member 74 can include a beveled surface 76 for insertion through and engagement with the locking orifice 70. When using the wedge member 74, in a preferred embodiment, the beveled surface 76 is only a slight bevel, with respect to a wedge member rear surface 77. This slight bevel provides increased frictional engagement between the locking orifice 70 and the first coupling element rear member 28, while also allowing the wedge member to be easily disengaged when moved in an upward movement.

The locking tab 62 of the second coupling element 14 can be a substantially square-shaped bar member 78, which is attached to the second coupling element second end 44. For example, this bar member 78 can be welded to the second coupling element mating surface 46. Importantly, the bar member 78 extends along the width of the second coupling element mating surface 46 and provides further additional securement between the first coupling element 12 and second coupling element 14. The alignment member 60 may also have a curved distal end 80, which further assists in aligning the alignment member 60 prior to insertion through its respective alignment orifice 32.

Figure 6:
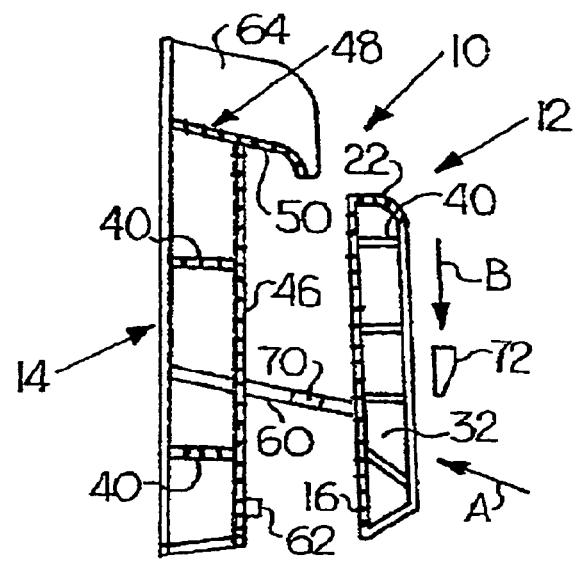
FIG. 6 is a side, sectional view of the first coupling element of FIG. 1 and the second coupling element of FIG. 3, immediately prior to engagement.
Figure 7:
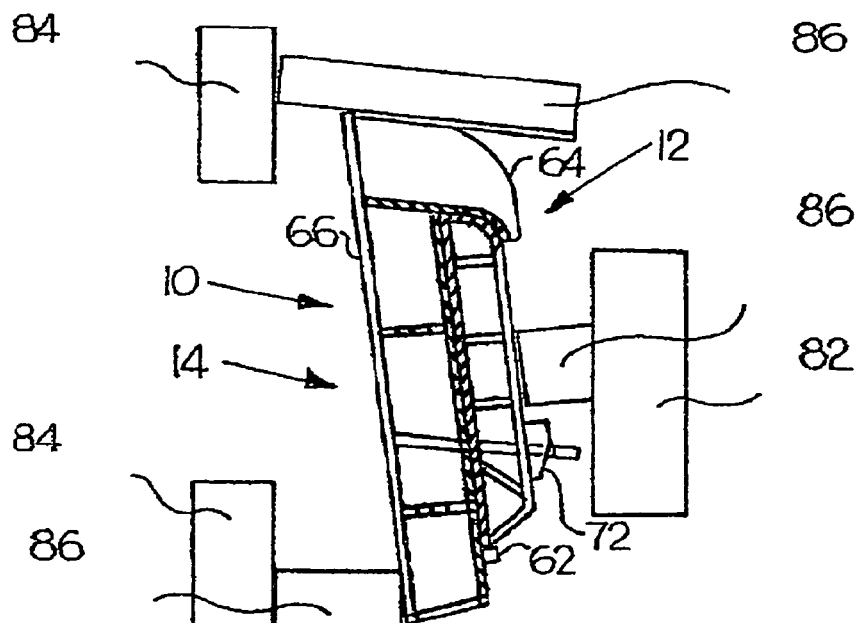
FIG. 7 is a side, sectional and schematic view of the first coupling element of FIG. 1 engaged with the second coupling element of FIG. 3, with the coupling apparatus used to couple a vehicle to a piece of equipment.

Turning to its operation, as seen in FIGS. 6 and 7, the first coupling element 12 is placed or positioned immediately adjacent the second coupling element 14, and, since distal ends 80 of the alignment members 60 extend beyond the distal end 52 of the wedge member surface 50, the distal ends 80 of the alignment members 60 are the first element to begin engagement between the first coupling element 12 and the second coupling element 14. Specifically, as the first coupling element 12 is moved toward the second coupling element 14, the alignment members 60 begin to move through the alignment orifices 32 and, due to the angular positioning of the alignment members 60, the first coupling element first end 18 begins to move towards the second coupling element first end 42.

Once partially engaged, the first coupling element 12 is moved in the direction of arrow A, and, due to the use of the curved portions (24, 58) and the planar portions (26, 56), the first coupling element mating surface 16 does not fully mate with the second coupling element mating surface 46 until the first coupling element 12 is fully engaged with the second coupling element 14. Further, this full engagement does not occur until the engagement surface 30 abuts with and is snapped (or frictionally engaged) over the locking tab 62.

Therefore, when the first coupling element 12 is fully engaged with the second coupling element 14, the first coupling element mating surface 16 abuts with the second coupling element mating surface 46; the wedging surface 22 fits within and abuts the wedge member surface 50; the alignment members 60 extend through the alignment orifices 32, with the distal end 80 of each alignment member 60 extended fully through the alignment orifices 32, such that the locking orifices 70 on each alignment member 60 have also fully extended through the alignment orifices 32; and, finally, the engagement surface 30 abuts the locking tab 62. As seen fully engaged in FIG. 7, the first coupling element 12 and the second coupling element 14 provide a highly secure engagement. In addition, after fully engaging the first coupling element 12 and the second coupling element 14, the locking pins 72 are inserted through and engaged with the locking orifice 70 on each alignment member 60. In a preferred embodiment, these locking pins 72 are pneumatically forced into engagement with the locking orifice 70 in the direction of arrow B, providing even greater securement.

In a preferred embodiment, the first coupling element second end 20 and the second coupling element second end 44 extend at an angle, relative to the first coupling element mating surface 16 and the second coupling element mating surface 46, respectively. Such usage of angles allows greater clearance underneath the coupling apparatus 10 after the first coupling element 12 has been engaged with the second coupling element 14. This clearance is best seen in FIG. 7.

The present invention provides a coupling apparatus 10 that is particularly adapted for the engagement between a locomotive force, such as a vehicle 82 and a large, industrial size piece of heavy equipment 84, which requires transport or locomotive force. As seen in FIG. 7, in a preferred embodiment, the vehicle 82 is attached to the first coupling element 12 via an attachment mechanism 86. This attachment mechanism 86 may be a mechanical, chemical or other interactive attachment force between the vehicle 82 and the first coupling element 12. In a preferred embodiment, the attachment mechanism 86 is a series of welds between the vehicle 82 and the first coupling element 12.

Similarly, the equipment 84 is attachable to the second coupling element 14 via the attachment mechanism 86. Again, this attachment mechanism can be any manner of attachment, whether mechanical, chemical, etc. For example, the equipment 84 could be welded directly to the second coupling element 14, but this may not be preferable if the user wishes to use different types of equipment 84 in connection with the second coupling element 14. In that case, it would be preferable for the attachment mechanism 86 to be some standard attachment joint or bearing surface, upon which the equipment 84 could be attached. As seen in FIG. 7, equipment 84 can be attached via the attachment mechanism 86 to either or both the second coupling element first end 42 and the second coupling element second end 44. Of course, the relative positioning of the equipment 84 with respect to the vehicle 82 must be considered in order to increase the functionality of the coupling apparatus 10.

Due to the strength of materials used to manufacture the coupling apparatus 10, together with the multiple and varied mating, aligning and attachment surfaces, the coupling apparatus 10 is particularly adapted to securely couple an industrial vehicle 82 and a heavy piece of equipment 84. The vehicle 82 can be any type of locomotive mechanism, such as a bulldozer, a forklift, a backhoe, an earthmover, a truck, a machine, a tool, an implement and device.

In this manner, the present invention is a coupling apparatus 10 that provides a sturdy, yet releasable, attachment, between two objects, such as the vehicle 82 and the equipment 84. Due to the unique structure and engagement between the first coupling element 12 and the second coupling element 14, the coupling apparatus 10 is particularly adapted to industrial operations. In addition, since the coupling apparatus 10 includes a first coupling element 12 and a second coupling element 14, a separate second coupling element 14 can be attached to multiple and varied pieces of machinery, devices, apparatus, equipment, etc., and a single first coupling element 12 can be attached to a single vehicle 82 for use with any of the equipment 84.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A coupling apparatus for attaching a heavy-machinery implement to a vehicle, comprising:
   a first coupling element having an upper first end and a lower second end and comprising opposing front and rear plates, the rear plate comprising an attachment mechanism for attaching to a vehicle, and further comprising:
   a planar mating surface disposed on the front plate extending between the first and second ends of the first coupling element;
   a wedging surface disposed along the upper first end of the first coupling element and extending between the front and rear plates, the wedging surface comprising a beveled planar portion adjacent the front plate angled downwardly toward the rear plate and an adjoining convex curved portion adjacent the rear plate;
   an engagement surface disposed along the second lower end of the first coupling element adjacent the front plate; and
   at least one alignment orifice extending through the front and rear plates, each orifice comprising a substantially rectangular cross-section having a beveled bottom surface angled downwardly from the front plate toward the rear plate; and
   a second coupling element having an upper first end and a lower second end and comprising opposing front and rear plates, the rear plate comprising an attachment mechanism for attaching to a heavy-machinery implement, and further comprising:
   a planar mating surface disposed on the front plate extending between the first and second ends of the second coupling element, and configured to matingly abut with the first coupling element mating surface in a coupled position of the first and second coupling elements;
   a hook-shaped wedge member disposed along the upper first end of the second coupling element and extending outwardly from the front plate of the second coupling element, the wedge member comprising a beveled planar portion at a proximal end of the wedge member angled downwardly away from the front plate and a concave curved portion at a distal end of the wedge member, and configured to matingly engage with the wedging surface in the coupled position;
   at least one plate-shaped alignment member extending from the second coupling element mating surface at a downward angle away from the front plate and configured to extend through the at least one alignment orifice of the first coupling element, each alignment member comprising a locking orifice extending through opposing sides thereof; and
   a locking tab extending from the second coupling element mating surface adjacent the lower second end of the second coupling element and configured to matingly abut the engagement surface of the first coupling element in the coupled position; and
   at least one locking pin configured to be inserted through and frictionally engage the locking orifice of the at least one alignment member;
   wherein the wedging surface is inserted into the hook-shaped wedge member such that the alignment member is aligned with the beveled bottom surface of the alignment surface; and the first coupling element is pivoted relative to the second coupling element into the coupled position such that first coupling element mating surface engages the second coupling element mating surface, the planar and curved portions of the wedge member matingly engage with the planar and curved portions of the wedging surface, and the locking tab matingly abuts the engagement surface of the first coupling element; the locking pin being inserted through the locking orifice of the alignment member and frictionally engaging the rear plate of the first coupling element to clamp the first and second coupling elements in the coupled position.

2. The coupling apparatus of claim 1, further comprising a plurality of alignment members located in a spaced apart position and extending from the mating surface of the second coupling element, and a plurality of corresponding alignment orifices extending through the mating surface of the first coupling element.

3. The coupling apparatus of claim 1, wherein the locking pin is a wedge member with at least one beveled surface configured to frictionally engage the locking orifice.

4. The coupling apparatus of claim 1, wherein the locking tab is a substantially square-shaped bar member attached on the second coupling element second end.

5. The coupling apparatus of claim 1, wherein the engagement surface of the first coupling element is positioned at a bottom surface of the front plate forming the mating surface of the first coupling element.

6. The coupling apparatus of claim 1, wherein the alignment member has a substantially curved distal end.

7. The coupling apparatus of claim 1, wherein the attachment mechanism attached to the first coupling element is configured to allow attachment of a bulldozer, a forklift, a backhoe, an earthmover or a truck to the first coupling element.

8. The coupling apparatus of claim 7, wherein the attachment mechanism attached to the second coupling element is configured to allow attachment of a machine, a tool or a heavy-machinery implement to the second coupling element.

9. The coupling apparatus of claim 1, wherein the first coupling element is a box-shaped structure comprising a plurality of support plate elements extending between the front and rear plates of the first coupling element.

10. The coupling apparatus of claim 1, wherein the second coupling element is a box-shaped structure comprising a plurality of support plate elements extending between the front and rear plates of the second coupling element.

* * * * *